United States Patent [19]

Fortuna et al.

[11] 3,810,020

[45] May 7, 1974

[54] ENCODER-DECODER FOR PCM SYSTEMS

[75] Inventors: Achille C. Fortuna, Foster City; Hans-Uno Persson, San Francisco, both of Calif.

[73] Assignee: Lynch Communication Systems, Inc., San Francisco, Calif.

[22] Filed: June 5, 1972

[21] Appl. No.: 259,940

[52] U.S. Cl. .................................. 325/141, 332/9 R

[51] Int. Cl. .............................................. G01r 7/00

[58] Field of Search ...... 179/15 AP; 332/11 D, 9 R, 332/11 R; 325/141, 38 B

[56] References Cited

UNITED STATES PATENTS

| | | | |
|---|---|---|---|
| 3,071,727 | 1/1963 | Kitsopoulos | 179/15 AP |
| 3,609,551 | 9/1971 | Brown et al. | 332/11 D |

*Primary Examiner*—Benedict V. Safourek
*Assistant Examiner*—Jin F. Ng
*Attorney, Agent, or Firm*—Mellin, Moore & Weissenberger

[57] ABSTRACT

High accuracy at low signal amplitudes is achieved in the encoder section of an encoder-decoder for PCM signals together with low cost by using a feedback linear encoder with a digital compandor, dividing the companding scale into two ranges having an equal number of segments, providing a separate comparator for each range, and using the same set of weights for both comparators. A shift weight is provided to go from the low-level comparison to the high-level comparison, and a ratio-producing network is provided to multiply the effect of each weight by the appropriate expansion factor in the high-level comparator as compared to the low-level comparator.

4 Claims, 5 Drawing Figures

ENCODER-DECODER FOR PCM SYSTEMS

BACKGROUND OF THE INVENTION

In the telephone art and in other electronic applications, it is frequently necessary to convert a pulse-amplitude-modulated (PAM) signal into a pulse-code-modulated (PCM) signal. Specifically, current telephone practice requires conversion of amplitude-modulated signal samples into eight-bit binary words representative of the amplitude of the samples.

The conversion is accomplished by dividing the maximum sample amplitude into eight segments of sixteen steps each. The steps within each segment are equal, but the segments are logarithmically related so that the steps in the second segment are twice as large as those in the first, those in the third twice as large as those in the second, etc. In this manner, the percentage accuracy of the code remains essentially constant throughout the full sample amplitude range.

Devices for accomplishing this function are well known. However, the very short comparison time available (the circuit has to be capable of making decisions in about 325 nanoseconds) and the wide dynamic range to be handled (the maximum encodable amplitude is 8,159 times the smallest step size) make this type of device very sensitive to high-frequency noise and requires a circuit complexity which poses substantial cost and reliability problems. Four approaches to the problem have previously been attempted, but all were unsatisfactory for the reasons stated:

1. A folding encoder with eight amplifier stages in cascade. To have a good performance with this type of encoder it should be designed to generate a Gray code so that the full encoding time is available to decide each bit. However, even if this approach is followed, operational amplifiers with wide bandwidth, controlled open loop rolloff and very low offset voltage are required. Usually to have a reasonable speed the diodes in the feedback have to be forward biased and this increases the static error. A good compromise between static and dynamic error imposes very stringent requirements for the amplifiers. 2. An encoder with eight comparators (one per segment) and eight linear decoders. This approach is attractive because the tolerance requirements for the linear decoders are rather loose and the comparators which have to be acurate are only those for the low-level segments. However, the number of weights and comparators is rather high. 3. A feedback encoder with an eight-position variable attenuator for the PAM sample and a linear decoder. This type of encoder requires a very simple logic but the comparison takes place at low level also for the high-level segments and therefore it is not accurate enough at high levels. 4. A feedback linear encoder with digital compandor. This type of encoder requires a rather complicated logic, but the analog circuitry is very simple and straightforward. Its most serious drawback is that it is difficult to prevent the digital noise and the switching transients from reaching the output of the weighting network. A good accuracy at low levels is therefore difficult to obtain.

SUMMARY OF THE INVENTION

The present invention solves the problems of the prior art by retaining the general concept of a feedback linear encoder with a digital compandor to obtain the benefit of the simple analog circuitry, and modifying it to reduce the complexity of the weighting network and to improve its low-level accuracy.

The invention accomplishes this result by splitting the eight segments of comparison steps into two levels, and using separate comparators for the high level and the low level. Although this approach is at first blush more complex than that of the prior art, it actually results in a nearly 25 percent reduction in the complexity of the expensive weighting network while at the same time increasing the low-level accuracy sixteenfold.

Specifically, a shift weight is used to provide a reference level corresponding to the top of the low-level range whenever a high-level comparison is called for; and a ratio-producing scheme is employed in the comparison network to cause each weight of the weighting network to have 16 times the effect on the high-level comparator that it does on the low-level comparator. In this manner, a single set of 20 weights (10 for each polarity) can be used for both comparators, instead of the 26 weights which would be required for a straight comparison with a resultant loss of accuracy.

It is therefore the object of the invention to provide a low-cost encoder which is highly accurate at low levels, has a minimum of analog circuitry, and is relatively insensitive to high-frequency noise.

It is another object of the invention to provide an encoder of the type described which uses separate high- and low-level comparators using the same set of weights.

It is a further object of the invention to provide an encoder using a minimum number of weights.

DESCRIPTION OF THE PREFERRED EMBODIMENT

Figures 1, 2:
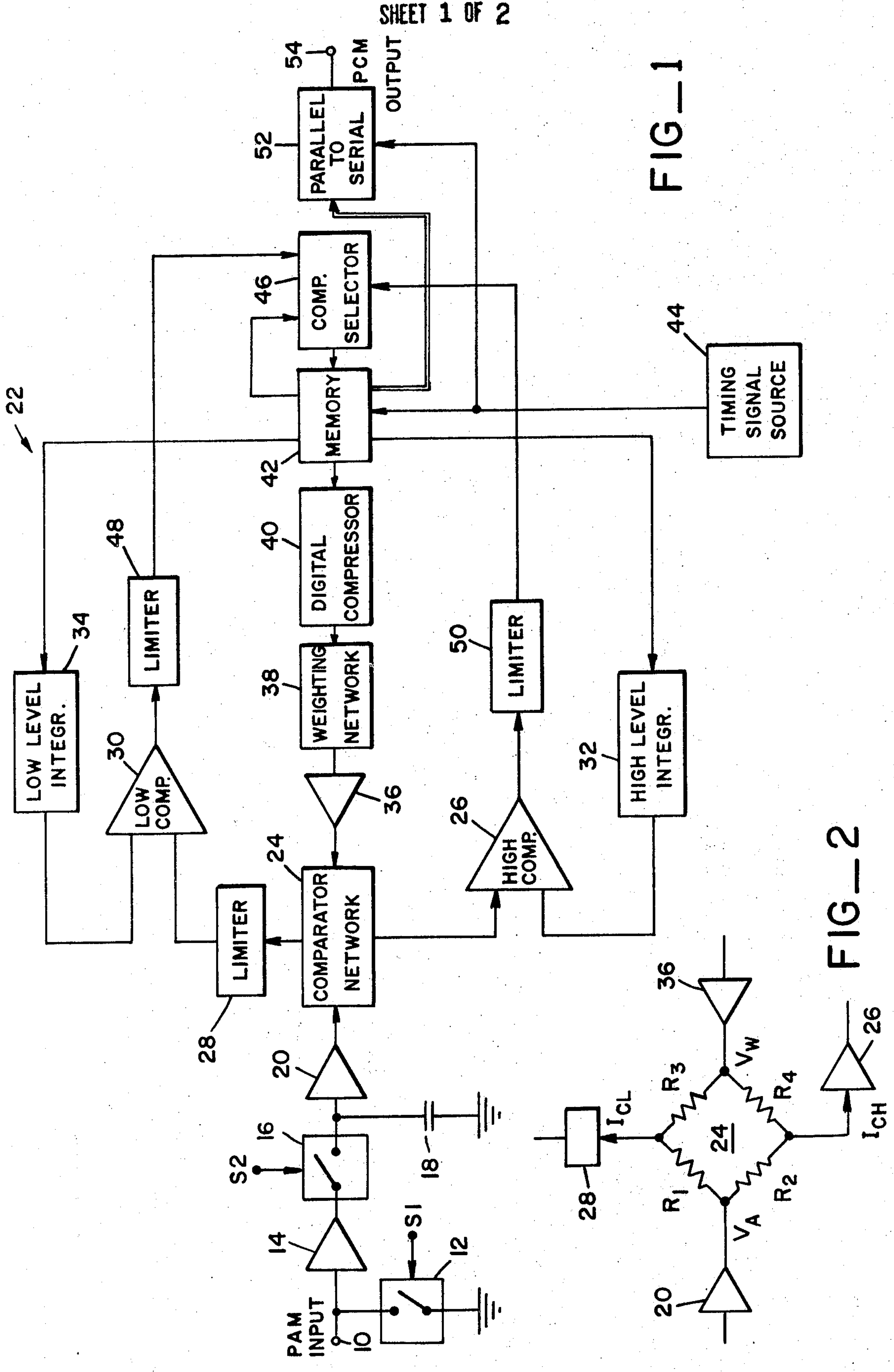
FIG. 1 is a block diagram of the encoder of this invention.
FIG. 2 is a circuit diagram of the comparison network used in the invention.

Referring first to FIG. 1, the pulse-amplitude-modulated (PAM) signal to be encoded is supplied to the circuit at input terminal 10. A grounding gate 12 is provided to ground input 10 between PAM signal samples to provide a reference for the automatic calibration of the circuit, which will be discussed hereinafter. Following amplification by amplifier 14, a sampling gate 16 is provided to impress alternating signal and reference samples on holding capacitor 18, which maintains each sample for the time interval required for the circuit to perform its computations. Thus, the output of clamping amplifier 20 is an analog signal ready for encoding by the encoder 22 of this invention.

The encoding process consisting of a translation of the analog voltage of the input signal sample into an eight-bit binary word, the eight bits of the word being sequentially transmitted from the encoder output as a pulse-code-modulated (PCM) signal. The first digit or bit of the binary word (hereinafter called $B_1$) indicates the sign of the PAM sample (1 for positive levels and 0 for negative levels), and the remaining seven bits or digits (hereinafter called $B_2$ through $B_8$) indicate its magnitude in inverted binary code. 128 ($2^7$) positive voltage levels and equally many negative levels can thus be coded.

The voltage difference between levels corresponding to consecutive code bits varies in such a way as to provide voltage levels closely spaced in the low voltage range and much more widely spaced in the high voltage range (a logarithmic distribution). The voltage range between zero and the overload level is divided into eight parts or segments each having 16 steps. Within each segment, steps are of equal size, but in each segment, the step size is double the step size of the segment below it. Segment number one (the lowest segment) has an irregularity: the first step is half the size of each of the following steps.

The analog signal supplied to encoder 22 is applied to one input of a comparison network 24 of conventional design. The other input to the comparison network 24 is a succession of comparison voltages representing the successive comparison levels of the encoding process, to be discussed hereinafter.

The result of the comparison in comparison network 24 is fed to one input of a high-level comparator 26, and through a limiter 28 to one input of a low-level comparator 30. The use of two separate comparators allows a considerable improvement in signal-to-noise ratio at low signal levels, and also makes possible a much simpler weighting network.

The other input to each of the high and low comparators 26, 30 is derived, respectively, from a high-level integrator 32 and a low-level integrator 34. The integrators 32, 34 use feedback to produce a true zero level compensated for temperature drift and other circuit variations, by integrating the sign bits of the successive reference level samples produced by grounding gate 12, and adjusting their output unitl exactly half the sign bits of the reference level samples over a predetermined time interval are 1 and half are 0.

The encoding process is sequential, i.e., one bit of the eight-bit code word is determined in each of the eight time slots $t_1$ through $t_8$ during which the analog sample is presented to the input of comparison network 24. The determination of each bit is made by comparing the analog signal to a comparison voltage which, bit by bit, zeroes in on the analog signal in the manner described below.

The comparison voltages successively presented to comparison network 24 are produced by amplifier 36 and weighting network 38 under the control of digital compressor 40, which in turn is sequentially operated as hereinafter described by the memory 42. The memory 42, in turn, is sequentially switched by timing signals provided by timing signal source 44. The 128 comparison voltage levels are divided into two ranges: 64 low levels (segments 1 through 4) and 64 high levels (segments 5 through 8). If the steps of segments one through four are expanded 16 times by the ratio-producing network 24 (with appropriate compensation for the irregularity in segment one) and a shift voltage corresponding to level $L_{64}$ (i.e., the bottom of segment 5) is added, the high level voltage range is obtained. Thus it is possible to utilize the same weighting network output (except for the constant voltage shift) for both the low and the high voltage range.

At time $t_1$, a comparison voltage of zero is supplied to comparison network 24, and memory 42 operates comparator selector 46 to select the output of low-level comparator 30, limited to logic level by limiter 48. If the output of limiter 28 is more positive than that of integrator 34, a 1 is entered in the first bit of memory 42; otherwise, a 0 is entered. Thus, the first bit of memory 42 stores the sign of the analog sample.

At time $t_2$, the second bit of memory 42 is set to 0 by timing circuit 44, while its third through eight bit are set to 1. As a result, digital compressor 40 receives the binary word $B_1$0111111 from memory 42. This causes weighting entwork 38 and amplifier 36 to produce a comparison voltage equal to comparison level $L_{64}$. The sign of this comparison voltage is determined by the previously ascertained value of $B_1$. Simultaneously, the comparator selector 46 is switched to select the input from the high-level comparator 26, which is limited to logic level by limiter 50. The selection of the high-level comparator is always coincident with the production of a comparison voltage of level $L_{64}$ or higher.

The comparators 26, 30 are so arranged that their logic output is representative only of the magnitude of the analog signal, once its sign has been determined by the first comparison. If the analog signal is greater than the comparison signal, the output of the comparator is 0, otherwise it is 1. The reason for this reverse code is that it will tend to produce a large number of 1 bits in the absence of any analog signal, thus maintaining an adequate pulse density at all times on the PCM telephone line to which the output of the encoder 22 is connected.

With the sign bit $B_1$ and the most significant bit $B_2$ now established, the digital compressor is supplied at time $t_3$ with the binary word $B_1B_2$011111. If $B_2$ was 0, this word is in the high-level range, and the high-level comparator 26 will be used for the $t_3$ comparison, and the comparison will be with a comparison voltage corresponding to level $L_{96}$. On the other hand, if $B_2$ was 1, the $t_3$ word is in the low-level range, and the low-level comparator will be used for comparison of the analog input with level $L_{32}$. The result of either comparison determines the value of $B_3$, which is stored in the memory 42.

In like manner, the digits $B_4$ through $B_7$ are determined in sequence and stored. The last determination is that of $B_8$ at time $t_8$; however, $B_8$ is not stored but is transferred directly to the parallel-to-serial converter 52, together with the digits $B_1$ through $B_7$ stored in memory 42. The memory 42 is thus cleared and is ready to receive the next computation while the converter 52 serially transmits digits $B_1$ through $B_8$ to the PCM output 54 of encoder 22.

The weighting network 38 uses the sign bit, magnitude bits $B_2$ through $B_7$, and timing signals $A_1$ and $A_2$ to control the 10 positive and 10 negative weights which, acting together, create the 128 comparison levels.

The multiplication of the weights by 16 to produce the steps of the high range is accomplished in the following manner: The comparison network 24 consists of four resistors $R_1$, $R_2$, $R_3$, and $R_4$. The comparators 26, 30, are responsive to the current flow $I_{CH}$ and $I_{CL}$, respectively, which they receive from comparison network 24. In FIG. 2, the low-level comparator will be in equilibrium $$\text{when } V_A/R_1 = V_W/R_3$$

and the high-level comparator will be in equilibrium $$\text{when } V_A/R_2 = V_W/R_4$$

In order for the high-level comparator 26 to see a $V_W$ sixteen times as large, with respect to $V_A$, as does the low-level comparator 30, the resistances of the resistors forming the network 24 are as follows: If $R_2 = R_1$, $R_4 = 16\ R_3$; or, if $R_2 = kR_1$ (as is usually desirable for design reasons), then $R_4 = 16k\ R_3$.

A typical switching arrangement for the weights of the weighting network 38 (or, in other words, a chart of the positions of the flip-flop circuits of digital compressor 40 which control the weights of the network 38) is shown in Table I below. In Table I, the PCM word bits 1 through 8 are listed in descending order of significance for each segment. Individual steps within each segment are determined by the sixteen possible combinations produced by switching $B_5$, $B_6$, $B_7$, and $B_8$ between logic 1 and logic 0.

The positive and negative weights 1 through 9 are listed in descending order of significance. S is the shift weight, which is switched into the weighting network whenever the high-level comparator 26 is in use. $A_1$ denotes the timing signal triggering the output to the parallel-to-serial converter 52, and $A_2$ denotes a timing signal which is grounded during the determination of the sign bit $B_1$ but is at logic 1 at all other times. The comparison signal $V_W$ (FIG. 2) is proportional to the sum of the positive and negative weights activated during any comparison cycle, taking into account the fact that, as previously stated, the comparison code is reversed to produce an all-1 code in the PCM line in the absence of any signal.

As explained above, the digital compressor 40, for each of the eight successive comparisons, takes the memory word created by the previous comparison and translates it into a switching pattern which energizes the proper weights of the weighting network to produce, at the output of amplifier 36, the proper reference or comparison voltage for the next comparison. By the same token, the comparator selector 46 is operated in accordance with the currently existing memory word to feed either the output of the low comparator or the output of the high comparator into the next memory element. In each comparison, if the PAM pulse amplitude is greater than the reference voltage, the memory stores a "0," otherwise it stores a "1."

Figure 3:
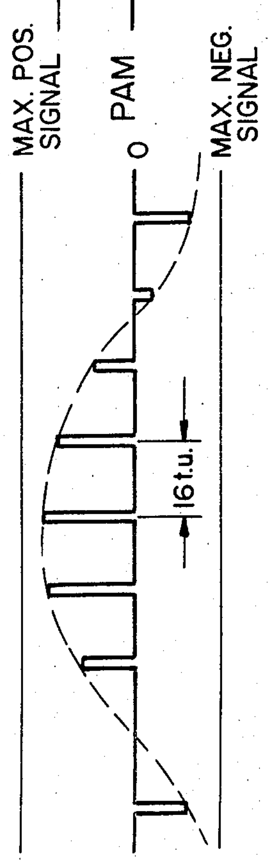
FIG. 3 represents a typical PAM pulse train to be translated into a constant-amplitude PCM pulse train in accordance with the teaching of this invention.

The functioning of the circuit is perhaps best illustrated by a specific example. The PAM pulse train may look something like FIG. 3. Each pulse of this PAM pulse train is to be translated into a constant-amplitude PCM pulse train looking something like the pulse train shown in FIG. 4.

Figure 5:
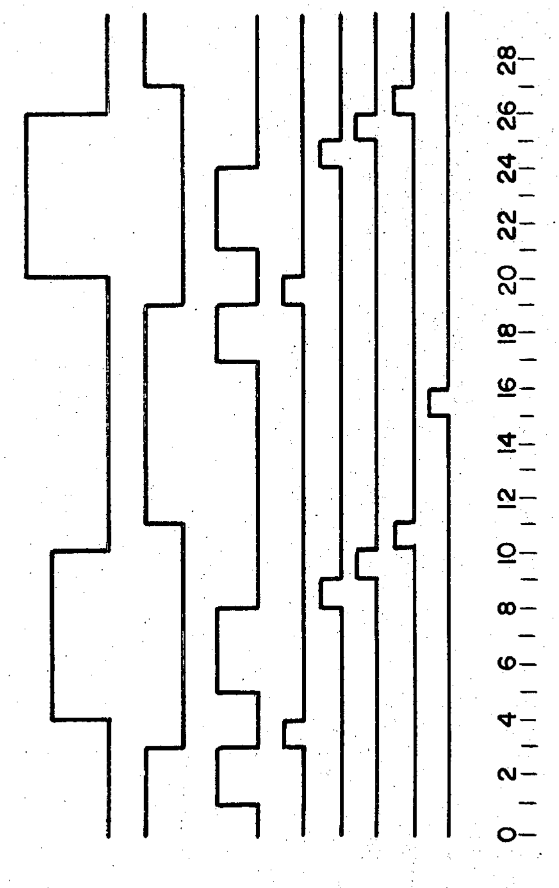
FIG. 5 shows the time relation of the PAM pulse, the switching operations and the comparison or encoding operations in accordance with the teaching of this invention.

The time relation of the PAM pulse, the $S_1$ and $S_2$ switching operations, and the comparison or encoding operations is shown in FIG. 5.

The encoding process takes place between points 8 and 16 on the time scale of FIG. 5. During this time, switch $S_2$ is open, and the amplitude of the last preceding PAM pulse (stored on capacitor 18 while switch $S_2$ is closed from 5 to 8 on the time scale) is held by capacitor 18 and presented as a steady voltage through amplifier 20 to comparator network 24. Let us suppose, for example, that the PAM pulse in question was positive, and that its amplitude was such as to fall into step 23 of the 128-step standard Bell System companding law. As stated in the specification, this companding law divides the area between zero and the maximum possible PAM pulse amplitude into eight segments, each subdivided in turn into 16 steps. Hence, the PAM pulse of the example falls into step 7 of segment 2.

As explained hereinabove, the encoding works as follows: Between points 8 and 9 on the time scale of FIG. 5 (i.e., during the first comparison of the encoding operation), the digital compressor 40 switches all weights in weighting network 38 off, so that amplifier 36 will feed comparator network 24 a zero reference voltage. Because the PAM pulse was positive, low comparator 30 indicates a signal-greater-than-reference condition, which causes the memory logic to store a "1" in the first memory element.

Between points 9 and 10 on the time scale of FIG. 5 (i.e., during the second comparison of the encoding operation), the digital compressor 40 energizes the positive shift weight S (Table I), so that the amplifier 36 will feed comparator 24 a reference voltage which the high comparator 26 sees as a voltage equal to the bottom of segment 5 (or the top of segment 4, which is the same thing). Since the PAM pulse amplitude lies in segment 2, the high comparator 26 indicates a signal-smaller-than-reference condition, which causes the memory logic to store a "1" in the second memory element.

Between points 10 and 11 on the time scale of FIG. 5 (i.e., during the third comparison of the encoding operation), the digital compressor 40 switches the weights of weighting network 38, by virtue of the information thus far stored in the first and second memory elements, so as to present to comparator network 24 a voltage equal to the top of segment 2. At the same time, comparator selector 46 selects the low comparator 30 because the "1" stored in the second memory element indicates that the PAM signal is in the low range (i.e., somewhere in segments 1–4). If, during the second comparison, a "0" instead of a "1" had been stored in the second memory element, the comparator selector would select the high comparator 26 instead of the low comparator 30.

Inasmuch as the PAM pulse amplitude is below the top of segment 2 in the example chosen, the third comparison results in a "1" being stored in the third memory element. This information is used by the digital compressor 40 in the fourth comparison to feed the comparator network 24 a voltage equal to the top of segment 1. This time, since the PAM pulse amplitude is above the top of segment 1, a "0" is stored in the fourth memory element.

The encoding process thus continues, with the digital compressor 40 each time using all the information previously determined to energize the correct weights needed to produce the proper reference voltage for the next comparison, until the eighth comparison finally determines that the PAM pulse amplitude lies in step 7 (rather than step 8) of segment 2. The logic "1" produced by the eighth comparison is not stored but is directly conveyed to the eighth parallel input of the parallel-to-serial converter 52, while the other seven stored bits of the memory word are simultaneously dumped into the other seven parallel inputs, thus clearing the memory for the next encoding operation.

Figure 4:
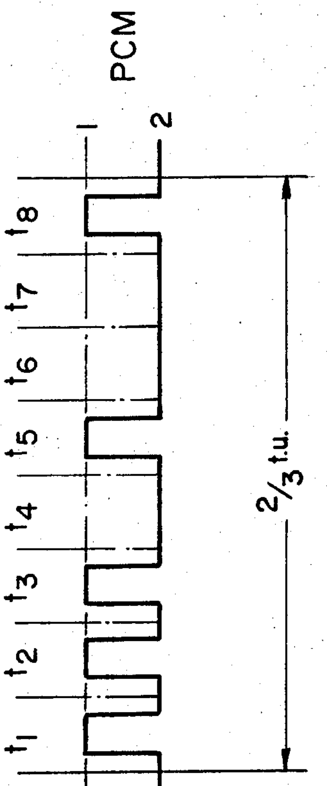
FIG. 4 represents the constant-amplitude PCM pulse train into which the PAM pulse train of FIG. 3 is translated in accordance with the teaching of this invention.

The parallel-to-serial converter translates the memory word into the PCM pulse train shown in FIG. 4. Note that in a 24-channel PCM telephone system, the entire eight-bit PCM pulse train can only be two-thirds of one time unit long (i.e., 1/24 of the spacing between PAM pulses).

The "calibrate comparators" line in FIG. 5 indicates the timing of the encoding of the sign bit of a known zero PAM level (stored on capacitor 18 by the simultaneous closing of switches $S_1$ and $S_2$) to calibrate the comparators 26 and 30. During this calibrating operation, each comparator independently determines the sign of the PAM voltage it sees as compared to a zero reference voltage fed to comparator network 24 by amplifier 36, and conveys the sign information to its integrator (32, 34, respectively). Since each comparison must produce either a logic "0" or a logic "1" output, the comparators are properly calibrated whenever half of these calibrating zero-to-zero comparisons result in a positive sign indication and half in a negative sign indication. Each integrator continuously adjusts its comparator so that this statistical relationship will hold true.

d. clocked logic means for successively producing comparison signals of predetermined amplitudes and for storing the results of a predetermined number of successive comparisons between said sample and said comparison signals; and e. parallel-to-serial converter means for sequentially reading out said stored results to form a PCM signal output.

2. The apparatus of claim 1, in which said logic means include a weighting network containing weights combinable to produce one-half of said comparison signals and further containing a shift weight; said apparatus further comprising ratioing means connected to feed to said low-level comparator the difference between said sample and said comparison signals, and to feed to said high-level comparator the difference between said sample and said comparison signals times a predetermined multiplier augmented by a shift signal determined by said shift weight.

3. The apparatus of claim 2, in which said logic means further include means to select for storage the output of either said low-level or said high-level comparator means, and to activate said shift weight whenever said high-level comparator means is selected.

4. The apparatus of claim 3, in which said logic is arranged to select said low-level comparator means for the determination of the sign bit of each sample, said high-level comparator means for the determination of the most significant bit, and either said high-level or said low-level comparator means for the determination of all other bits, depending upon whether the most significant bit is determined to be 0 or 1.

TABLE I

| Segment NR | Sign of sample | PCM channel word 1 | 2 | 3 | 4 | 5 | 6 | 7 | 8 | Positive weights 1 | 2 | 3 | 4 | 5 | 6 | 7 | 8 | 9 | S | Negative weights 1 | 2 | 3 | 4 | 5 | 6 | 7 | 8 | 9 | S |
|---|---|---|---|---|---|---|---|---|---|---|---|---|---|---|---|---|---|---|---|---|---|---|---|---|---|---|---|---|---|
| 1 | + | 1 | 1 | 1 | 1 | B5 | B6 | B7 | B8 | 0 | 0 | 0 | 1 | 0 | 0 | 0 | 0 | 1 | 0 | 0 | 0 | 0 | 1 | $\overline{B5}$ | $\overline{B6}$ | $\overline{B7}$ | A1 | 0 | 0 |
| 2 | + | 1 | 1 | 1 | 0 | B5 | B6 | B7 | B8 | 0 | 0 | 0 | 1 | 0 | 0 | 0 | 0 | 1 | 0 | 0 | 0 | 1 | $\overline{B5}$ | $\overline{B6}$ | $\overline{B7}$ | A1 | 0 | 0 | 0 |
| 3 | + | 1 | 1 | 0 | 1 | B5 | B6 | B7 | B8 | 0 | 0 | 0 | 1 | 0 | 0 | 0 | 0 | 1 | 0 | 0 | 1 | $\overline{B5}$ | $\overline{B6}$ | $\overline{B7}$ | A1 | 0 | 0 | 0 | 0 |
| 4 | + | 1 | 1 | 0 | 0 | B5 | B6 | B7 | B8 | 0 | 0 | 0 | 1 | 0 | 0 | 0 | 0 | 1 | 0 | 1 | $\overline{B5}$ | $\overline{B6}$ | $\overline{B7}$ | A1 | 0 | 0 | 0 | 0 | 0 |
| 5 | + | 1 | 0 | 1 | 1 | B5 | B6 | B7 | B8 | 0 | 0 | 0 | 1 | 0 | 0 | 0 | 0 | 0 | 0 | 0 | 0 | 0 | 1 | $\overline{B5}$ | $\overline{B6}$ | $\overline{B7}$ | A1 | 0 | 1 |
| 6 | + | 1 | 0 | 1 | 0 | B5 | B6 | B7 | B8 | 0 | 0 | 0 | 1 | 0 | 0 | 0 | 0 | 0 | 0 | 0 | 0 | 1 | $\overline{B5}$ | $\overline{B6}$ | $\overline{B7}$ | A1 | 0 | 0 | 1 |
| 7 | + | 1 | 0 | 0 | 1 | B5 | B6 | B7 | B8 | 0 | 0 | 0 | 1 | 0 | 0 | 0 | 0 | 0 | 0 | 0 | 1 | $\overline{B5}$ | $\overline{B6}$ | $\overline{B7}$ | A1 | 0 | 0 | 0 | 1 |
| 8 | + | 1 | 0 | 0 | 0 | B5 | B6 | B7 | B8 | 0 | 0 | 0 | 1 | 0 | 0 | 0 | 0 | 0 | 0 | 1 | $\overline{B5}$ | $\overline{B6}$ | $\overline{B7}$ | A1 | 0 | 0 | 0 | 0 | 1 |
| 1 | − | 0 | 1 | 1 | 1 | B5 | B6 | B7 | B8 | 0 | 0 | 0 | 1 | $\overline{B5}$ | $\overline{B6}$ | $\overline{B7}$ | A1 | 0 | 0 | 0 | 0 | 0 | 1 | 0 | 0 | 0 | 0 | A2 | 0 |
| 2 | − | 0 | 1 | 1 | 0 | B5 | B6 | B7 | B8 | 0 | 0 | 1 | $\overline{B5}$ | $\overline{B6}$ | $\overline{B7}$ | A1 | 0 | 0 | 0 | 0 | 0 | 0 | 1 | 0 | 0 | 0 | 0 | A2 | 0 |
| 3 | − | 0 | 1 | 0 | 1 | B5 | B6 | B7 | B8 | 0 | 1 | $\overline{B5}$ | $\overline{B6}$ | $\overline{B7}$ | A1 | 0 | 0 | 0 | 0 | 0 | 0 | 0 | 1 | 0 | 0 | 0 | 0 | A2 | 0 |
| 4 | − | 0 | 1 | 0 | 0 | B5 | B6 | B7 | B8 | 1 | $\overline{B5}$ | $\overline{B6}$ | $\overline{B7}$ | A1 | 0 | 0 | 0 | 0 | 0 | 0 | 0 | 0 | 1 | 0 | 0 | 0 | 0 | A2 | 0 |
| 5 | − | 0 | 0 | 1 | 1 | B5 | B6 | B7 | B8 | 0 | 0 | 0 | 1 | $\overline{B5}$ | $\overline{B6}$ | $\overline{B7}$ | A1 | 0 | 1 | 0 | 0 | 0 | 1 | 0 | 0 | 0 | 0 | 0 | 0 |
| 6 | − | 0 | 0 | 1 | 0 | B5 | B6 | B7 | B8 | 0 | 0 | 1 | $\overline{B5}$ | $\overline{B6}$ | $\overline{B7}$ | A1 | 0 | 0 | 1 | 0 | 0 | 0 | 1 | 0 | 0 | 0 | 0 | 0 | 0 |
| 7 | − | 0 | 0 | 0 | 1 | B5 | B6 | B7 | B8 | 0 | 1 | $\overline{B5}$ | $\overline{B6}$ | $\overline{B7}$ | A1 | 0 | 0 | 0 | 1 | 0 | 0 | 0 | 1 | 0 | 0 | 0 | 0 | 0 | 0 |
| 8 | − | 0 | 0 | 0 | 0 | B5 | B6 | B7 | B8 | 1 | $\overline{B5}$ | $\overline{B6}$ | $\overline{B7}$ | A1 | 0 | 0 | 0 | 0 | 1 | 0 | 0 | 0 | 1 | 0 | 0 | 0 | 0 | 0 | 0 |

We claim:

1. Apparatus for encoding amplitude-modulated signal samples into PCM signals, comprising:

a. a sample input;

b. a source of comparison signals;

c. separate high-level and low-level comparator means for comparing said sample to said comparison signals;

* * * * *